T. H. MARRINAN.
WORK SUPPORT FOR LEATHER WORKING MACHINES.
APPLICATION FILED APR. 8, 1908.
929,772.
Patented Aug. 3, 1909.
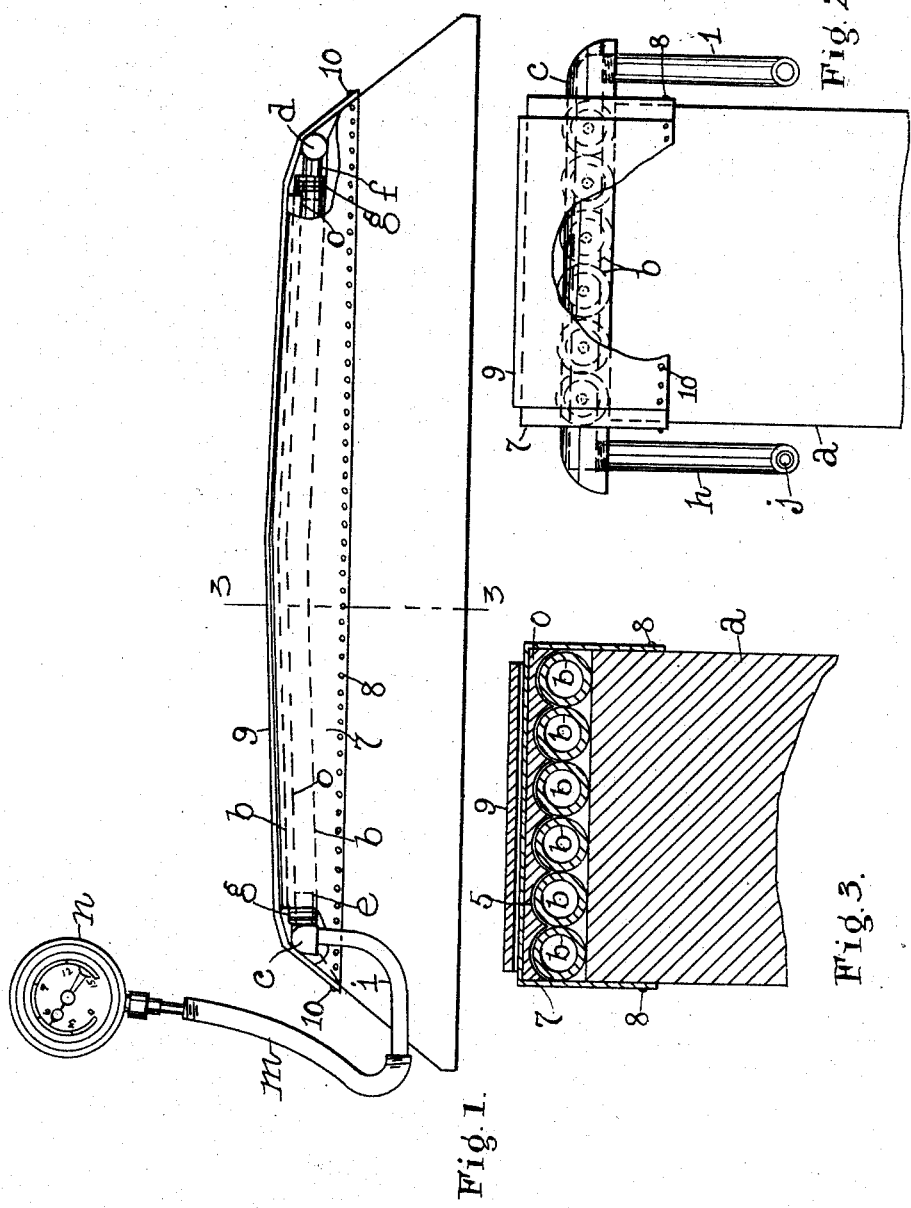
Witnesses.
C. H. Gannett
J. Murphy
Inventor.
Thomas H. Marrinan
by Jas. H. Churchill
Atty.

UNITED STATES PATENT OFFICE.

THOMAS H. MARRINAN, OF WOBURN, MASSACHUSETTS, ASSIGNOR TO WOBURN MACHINE COMPANY, OF WOBURN, MASSACHUSETTS, A COPARTNERSHIP.

WORK-SUPPORT FOR LEATHER-WORKING MACHINES.

No. 929,772.      Specification of Letters Patent.      Patented Aug. 3, 1909.

Application filed April 8, 1908. Serial No. 425,875.

*To all whom it may concern:*

Be it known that I, THOMAS H. MARRINAN, a citizen of the United States, residing in Woburn, in the county of Middlesex and State of Massachusetts, have invented an Improvement in Work-Supports for Leather-Working Machines, of which the following description, in connection with the accompanying drawings, is a specification, like letters on the drawings representing like parts.

This invention relates to a pneumatic bed or support for leather working machines, and has for its object to provide a simple and efficient support or bed which is especially adapted among other uses, to be employed in whitening or buffing machines, whereby a very light touch of the cutting tool or bladed cylinder upon the hide, skin or leather may be obtained, so as to avoid the removal of too much of the thicker part of the stock.

In accordance with this invention, the pneumatic bed is composed of a plurality of tubes or hollow yielding members containing air under pressure and independently responsive to external pressure, said tubes being arranged parallel to one another and in close contact or substantially so. The parallel tubes have coöperating with them a pad of yielding material, preferably rubber, which is provided with a substantially smooth outer surface, and with an inner or under surface having a plurality of parallel or substantially parallel grooves for the reception of the upper portion of said tubes, the said grooves being of sufficient depth to receive a considerable portion of the tubes and cause the spaces between adjacent tubes to be filled by portions of the pad, as will be described, so that the entire surface of the pad may be evenly supported by pneumatic pressure.

These and other features of this invention will be pointed out in the claims at the end of this specification.

Figure 1 is a side elevation of one form of bed or support embodying this invention. Fig. 2, an end elevation with parts broken away of the bed shown in Fig. 1 and Fig. 3, a cross section on the line 3—3, Fig. 1.

In the present instance I have shown the invention as embodied in a substantially flat bed, of the same general shape as the bed now commonly employed in machines known as whitening or buffing machines, to which my invention is particularly applicable, but I do not desire to limit my invention to the particular form of bed herein shown.

Referring to the drawings and especially Fig. 3, *a* represents a wooden or other base or support for the pneumatic bed, which latter is composed of a plurality of tubes or hollow members *b*, of rubber or other yielding material containing air under pressure, and arranged parallel or substantially so and preferably in contact with one another. In the present instance the tubes or members *b* are connected at their opposite ends to pipes *c*, *d*, extended transversely of the support *a* and provided, as shown, with nipples *e*, *f*, over which the ends of the tubes or members *b* are slipped and firmly secured, by wires *g* or in any other suitable manner. One of the end pipes as *d* is closed at its ends, and the other is provided as herein shown with branch pipes *h*, *i*, one of which as *h* may be provided with a suitable check valve *j*, similar to that used in a bicycle tube, and constitutes the air inlet pipe for the bed, and the other pipe *i* may be connected by a tube *m* with a pressure gage *n* of any suitable construction, by means of which the air pressure within the bed may be made known to the operator. The tubes or hollow members *b* of the pneumatic bed rest upon the base or support *a*, in contact with one another or substantially so, and have coöperating with them a pad *o* of rubber or other yielding material, which is provided on its under surface with substantially parallel grooves 5 (see Fig. 3) of a sufficient size to receive a considerable portion of the tubes or hollow members *b*, and preferably said grooves are made substantially semi-circular, so that the portions of the pad between the grooves are made materially thicker than the portions directly above the grooves, and of such thickness as to fill or substantially fill the spaces between adjacent tubes. As a result of this construction, the air pressure within the tubes or hollow members is uniformly distributed throughout the width and length of the pad, and consequently the operating tool, which is usually a bladed cylinder, is caused to act uniformly on the skin supported on the bed. The pads *o* may be held in place on the tubes or hollow members *b*, by means of a thin casing or layer of leather 7, which is secured to the base or support *a* by tacks 8 or otherwise. The bed may further be provided with a bolster 9 of leather or other suitable material which protects the casing 7, pad o and rubber tubes b, and may be secured at its ends to the base a by tacks 10 or otherwise.

The bed herein shown is especially adapted for use in machines employed for whitening and buffing leather and by regulating the pressure of the air within the tubes or hollow members a, the touch or cut of the bladed cylinder usually employed in this class of machines is adjusted to perform its work in the most efficient manner.

In the present instance, I have shown the invention as embodied in one form of bed, which is commonly referred to in the trade as a flat bed, but I do not desire to limit my invention to the particular form of bed herein shown.

Claims.

1. In a work support or bed of the character described, in combination, a base, a plurality of tubes or hollow yielding members in communication with one another and supported by said base and arranged in close proximity to one another, a pad of yielding material supported by said hollow members and provided on its under side with grooves for the reception of said members, means for retaining said pad in position on said hollow members, and a bolster supported by said pad, substantially as described.

2. In a work support or bed of the character described, in combination, a base, a plurality of hollow yielding members extended longitudinally of said base in substantially close proximity to one another, end pipes extended transversely of said base and provided with nipples to which said hollow members are secured, and a pad supported by said hollow members and provided on its under surface with grooves for the reception of said hollow members, substantially as described.

3. In a work support or bed of the character described, in combination, a base, a plurality of hollow yielding members in communication with each other and supported by said base, and a pad supported by said hollow members and provided on its under side with grooves for the reception of said hollow members, substantially as described.

4. In a work support or bed of the character described, in combination, a plurality of hollow yielding members in communication with one another and arranged in substantially close proximity to one another, and a pad supported by said members, substantially as described.

In testimony whereof, I have signed my name to this specification in the presence of two subscribing witnesses.

THOMAS H. MARRINAN.

Witnesses:
 JAS. H. CHURCHILL,
 J. MURPHY.